J. EKLUND.
STEAM TURBINE.
APPLICATION FILED SEPT. 28, 1914.

1,208,762.

Patented Dec. 19, 1916.
4 SHEETS—SHEET 1.

Witnesses
N. C. Jacobs.
P. M. Knight.

Inventor
JOEL EKLUND.
By
Bell & Huxley
Attorneys

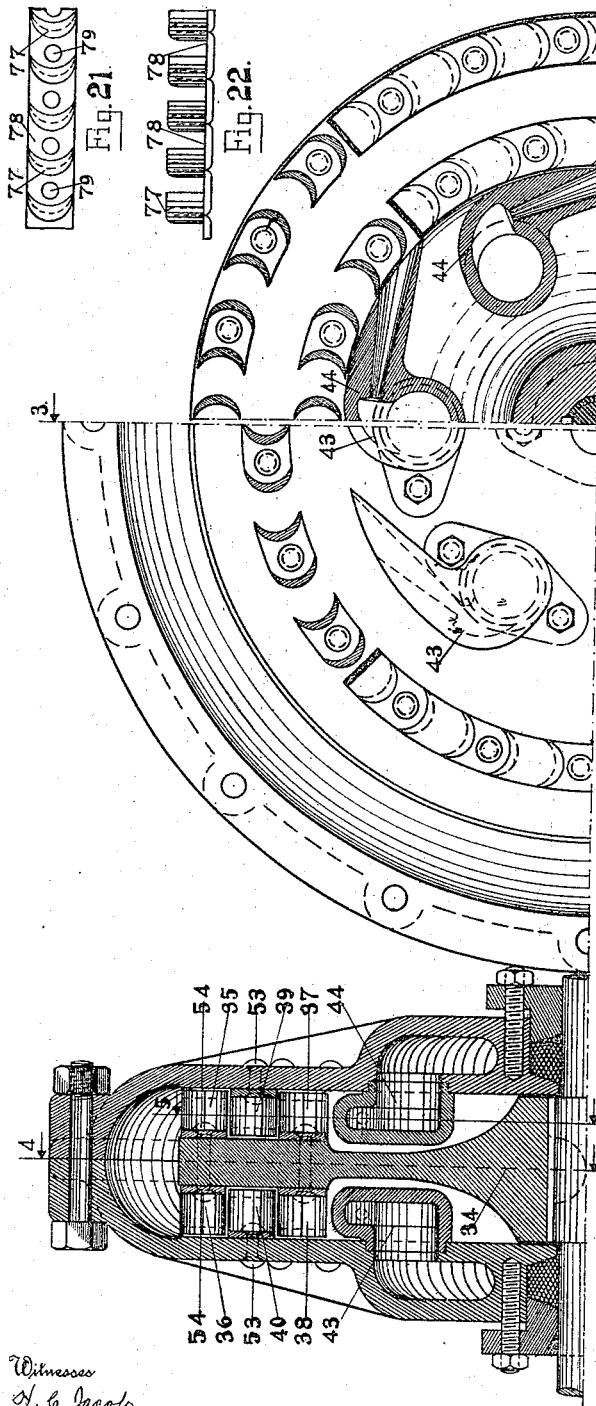

J. EKLUND.
STEAM TURBINE.
APPLICATION FILED SEPT. 28, 1914.
1,208,762.
Patented Dec. 19, 1916.
4 SHEETS—SHEET 3.
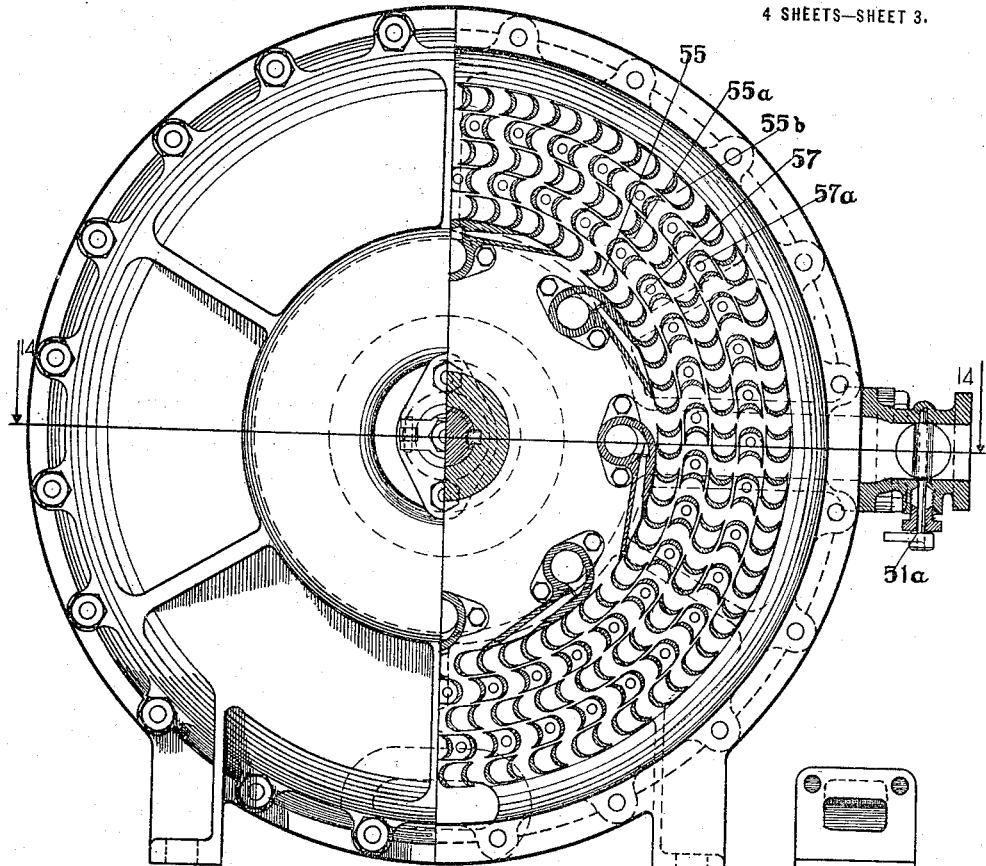
Fig. 12.
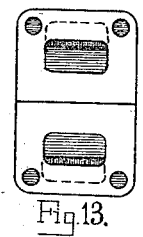
Fig. 13.
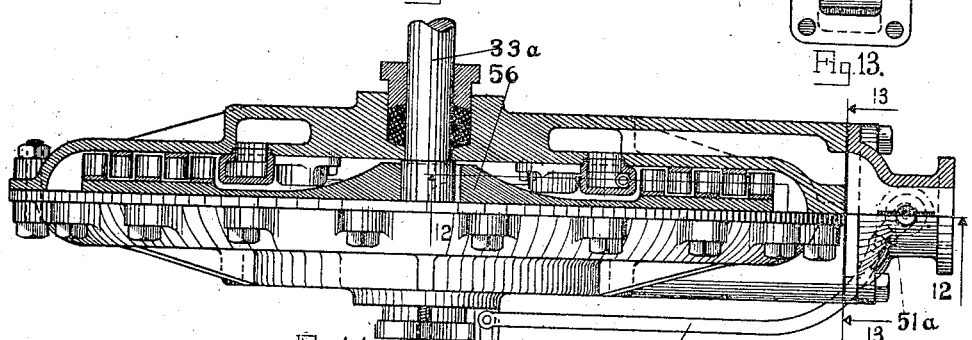
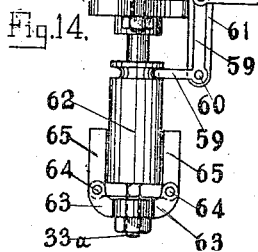
Fig. 14.
Inventor
JOEL EKLUND.
By Bell & Huxley
Attorneys
Witnesses
N. C. Jacobs
P. M. Knight

J. EKLUND.
STEAM TURBINE.
APPLICATION FILED SEPT. 28, 1914.

1,208,762.

Patented Dec. 19, 1916.
4 SHEETS—SHEET 4.

Inventor
JOEL EKLUND.
By
Bell & Huxley
Attorneys

Witnesses
H. C. Jacobs.
P. M. Knight

UNITED STATES PATENT OFFICE.

JOEL EKLUND, OF CHICAGO, ILLINOIS.

STEAM-TURBINE.

1,208,762.   Specification of Letters Patent.   Patented Dec. 19, 1916.

Application filed September 28, 1914. Serial No. 863,838.

*To all whom it may concern:*

Be it known that I, JOEL EKLUND, a citizen of the United States, residing at Chicago, in the county of Cook and State of Illinois, have invented certain new and useful Improvements in Steam-Turbines, of which the following is a specification.

My invention relates to an improved turbine construction and method of making the same, and has particularly for its object constructing the buckets of the steam turbine so that the proper theoretical conformation of the buckets may be attained without resorting to the expensive methods of construction heretofore employed.

By my invention the several series of buckets employed in connection with the turbine construction are formed from strips of metal and after they receive their proper conformation the strips of buckets are rigidly secured to the rotating and stationary parts of the turbine so as to properly coöperate. In this way the buckets may be given any desired exact conformation by means of special forming dies, and when the buckets are subsequently assembled upon their mounting members a turbine construction is the result, which is equally as efficient, if not somewhat more so, as the constructions heretofore produced by machining and inserting individual buckets upon the solid metal of the supporting members, which necessarily involves expensive operations requiring the utmost accuracy.

My invention also consists in an improved arrangement of supply chambers for the steam used to drive the turbine, as will appear more fully from a detailed description of the mechanism.

Figure 2:
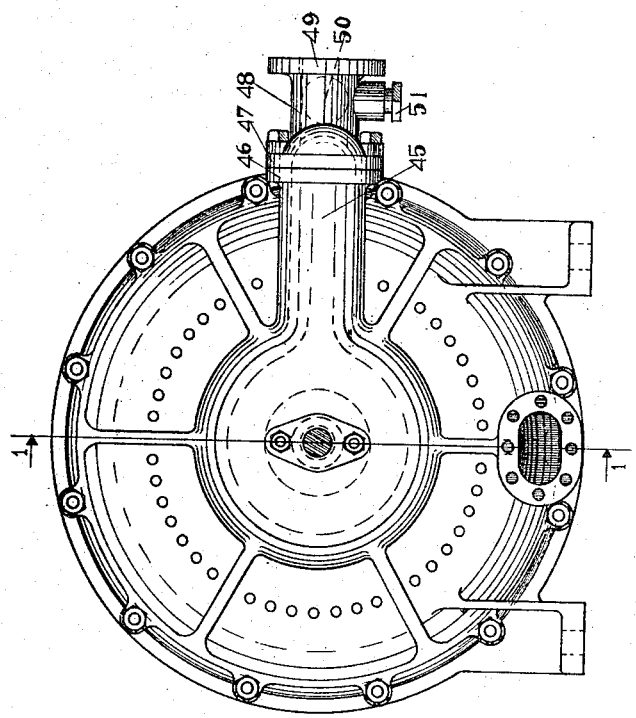
Figure 1:
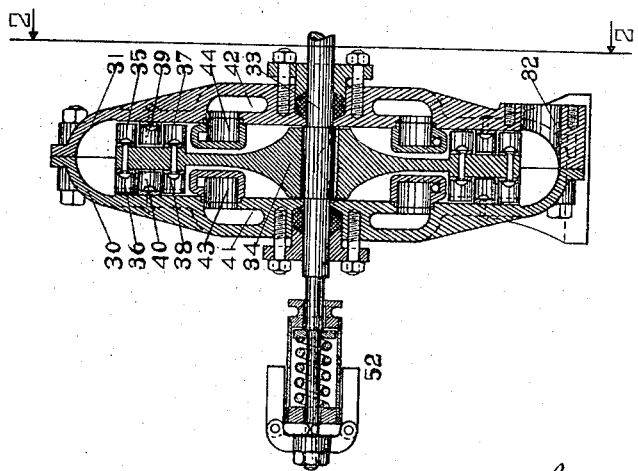
Figure 15:
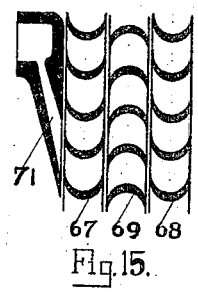
Figure 16:
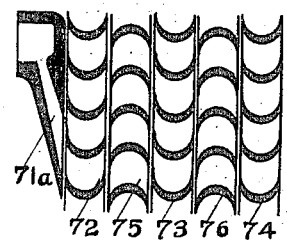
Figure 17:
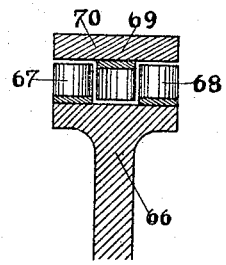
Figure 18:
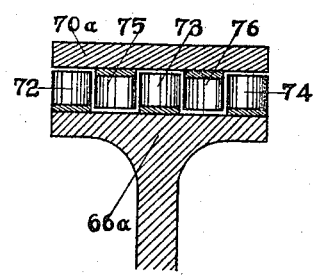
Figures 19, 20:
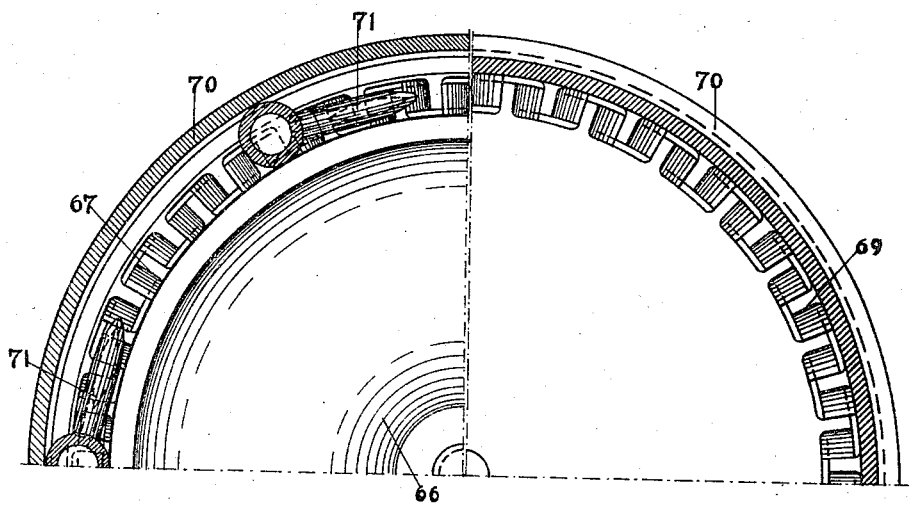

The several drawings illustrating my invention are as follows:

Figure 1 shows in vertical central sectional view along the line 1—1 in Fig. 2 a turbine construction of the radial-flow type; Fig. 2 is a side elevation of the turbine shown in Fig. 1 taken from the direction indicated at 2—2 of Fig. 1; Fig. 3 is an enlarged sectional view similar to Fig. 1 of the upper half of the structure therein shown, said view being taken from the direction indicated by the arrows 3—3 in Fig. 4; Fig. 4 is a sectional view of the parts shown in Fig. 3 taken along the line 4—4, with the exception of the bucket-supporting member, which is not shown in section; Fig. 5 is a sectional view of the parts shown in Fig. 3 taken along the line 5—5; Figs. 6 and 7 are plan and side views of a portion of a strip of buckets ready for assembly upon the bucket-supporting member; Fig. 8 is a sectional view taken through one of the nozzles shown in Figs. 1, 3, 4 and 5, said section being taken along the line 8—8 in Fig. 10; Fig. 9 is a view taken from the rear of the nozzle shown in Fig. 8; Fig. 10 shows in elevation the nozzle shown in Fig. 8; Fig. 11 is a sectional view through the nozzle shown in Fig. 9 taken along the line 11—11; Fig. 12 is a view showing partially in side elevation and partially in vertical section a turbine of the general construction shown in Figs. 1 to 5, inclusive, the only difference being that this turbine is provided with a larger number of series of buckets, the sectional portion of this figure being taken along the line 12—12 in Fig. 14; Fig. 13 is a detailed sectional view of the construction shown in Figs. 12 and 14, taken along the line 13—13; Fig. 14 is a view of the turbine shown in Fig. 12 and is partially in plan view and partially in horizontal section, taken along the line 14—14; Fig. 15 is a diagrammatic view showing the relation of bucket construction and nozzle when my bucket construction is employed in connection with a turbine of the axial-flow type; Fig. 16 shows in a view similar to Fig. 15 the relation of buckets and nozzle when a larger number of series of buckets is employed than that shown in Fig. 15; Fig. 17 is a vertical sectional view of a portion of the bucket-supporting members illustrating the manner of mounting the buckets for securing the arrangement indicated in Fig. 15; Fig. 18 shows in a view similar to Fig. 17 the manner of mounting the buckets for securing the construction illustrated diagrammatically in Fig. 16; Fig. 19 shows in side elevation a portion of the revoluble member of a turbine with the buckets secured thereto and nozzles in operative relation to said buckets for a turbine construction of the axial-flow type, the casing of the turbine being shown in section in this view; Fig. 20 shows in a view similar to Fig. 19 a series of stationary buckets supported by the casing of a turbine of the axial-flow type. Figs. 21 and 22 show, in views similar to Figs. 6 and 7, a modified form of bucket construction.

Similar numerals refer to similar parts throughout the several views.

As shown in Figs. 1 to 5, inclusive, the turbine illustrated is of the radial-flow type—that is to say, the steam employed for driving the turbine is introduced near the center of the turbine and flows outward radially through the several series of buckets, being discharged from the outer portion of the casing to the exhaust opening. The construction shown in these figures consists of a casing composed of two portions 30 and 31 similar to each other in all respects except that the portion 31 is provided with an exhaust connection 32 leading into the discharge chamber formed within the two portions around the outer series of buckets. The two portions 30 and 31 are provided with central bearings for a shaft 33, which bearings are provided with stuffing boxes, as indicated, and this shaft has rigidly secured thereto, by means of a key or equivalent device, a disk member 34, to which the series of buckets 35 and 36, 37 and 38 are secured upon opposite sides of said disk by rivets, bolts, or equivalent fastening devices, in the manner indicated. Intermediate the series of buckets 35 and 37 and the series of buckets 36 and 38 are disposed stationary series of buckets 39 and 40, respectively, these series of buckets being secured to the portions 31 and 30, respectively, of the casing by bolts, rivets, or equivalent fastening devices, in the manner indicated. The several series of buckets are mounted so that there is a clearance between them and between their outer ends and the adjacent surfaces of the portions of the casing and of the disk 34, which clearance is made as small as possible in view of mechanical requirements for operation. The portions 30 and 31 of the casing have formed in them, preferably by coring, steam supply chambers 41 and 42, respectively, which surround the bearings for the shaft 33, and these chambers have mounted on their inner walls, at regular intervals, nozzles 43 and 44, which are similar to each other except that they are opposite hand, and these nozzles project inwardly inside of the inner series of buckets 37 and 38, so that their delivery ends are as close to the inner surface of the inner series of buckets as running conditions require. The connection of these nozzles to the casing may be secured in any desired manner, as, for example, by means of cap screws, as indicated in Fig. 4. The recesses formed for the nozzles in the inner walls of the casing are preferably shouldered to receive corresponding portions formed on the nozzles so as to accurately locate the nozzles and make tight connection between the nozzles and the walls of the casing which provides a construction by which the nozzles may readily be assembled and replaced when necessary. Each of the chambers 41 and 42 is provided with a steam connection 45 formed preferably by coring and extending outside of the corresponding portion of the casing radially to the circumference thereof, where they terminate in flanged portions 46 connected with a corresponding flange 47 formed on the left-hand end of the throttle valve casing 48, which is provided at its left-hand end with an enlarged chamber for connecting the two steam supply connections 45, as more clearly appears by reference to Figs. 12, 13 and 14, which show a similar casing construction. The throttle valve casing 48 is provided at its right-hand end with a flange 49 for connection with any desired source of steam supply. The casing 48 is provided with a throttle valve 50 actuated by means of a lever 51 to shut off the supply of steam to the steam connections 45 to a greater or less extent as may be desired. The lever 51 is connected, as will be explained in connection with Fig. 14, with governing mechanism 52 so that the throttle valve 50 is automatically operated by said governing mechanism to maintain the speed of rotation of the shaft 33 practically constant.

In forming the series of buckets referred to the first step consists in taking a strip of sheet metal of any desired material, as steel, brass, etc., of the width required for the buckets and of a sufficient thickness to afford the necessary form and strength, and, either initially at the rolling mill or subsequently by means of suitable dies or cutters, imparting a convex surface to the strip on opposite sides so that the edges of the strip are sharp. This same condition can be produced by beveling the edges. The strip is then folded by means of forming-dies into what may be termed a toothed construction, the points or outer faces of the teeth being the connecting strips 35$^a$ and the roots or bases of the teeth being connected by the strips 35$^b$, while the faces of the teeth 35$^c$ constitute the buckets extending between the connecting strips 35$^a$ and 35$^b$, which buckets, by the forming operation, may be given any desired degree of concavity on the side to be engaged by the steam, which curves may be made as accurately as desired of the exact mathematical form found to secure the highest efficiency of operation. All that is required is to accurately make the forming dies of the desired curvature, and as a result the operating surfaces of the buckets will be given this curvature. As a result of the edges of the strips being sharpened, as described, the edges of the buckets will be sharp, and thus secure a construction found to be necessary for efficient bucket operation. The base portions 35$^b$ of the teeth are provided with holes 35$^d$ for securing the series of buckets either to the casing or a part carried thereby, or to the revoluble disk, as desired. All that is necessary after having formed the strips of buckets, as shown in Figs. 6 and 7, is to bend the strips transversely to the required radius, depending upon the dimensions of the revoluble disk and casing, and then to take a strip or strips as may be necessary to form each series and secure them by rivets 53 and 54 through properly spaced holes to the casing and rotary disk. It will be observed that the series of buckets 35 and 36 are held in place by common fastening devices, as are the series of buckets 37 and 38. As a result of the construction described, it will be observed that the effect of the thrust of the steam on opposite sides of the disk 34 is balanced axially, as a result of which no end thrust is communicated to the bearings of the shaft 33 but that, on the other hand, there is a constant tendency on the part of the disk 34 to rotate properly in its central position in the casing of the turbine.

The detailed construction of the nozzles is clearly shown in Figs. 8 to 11, inclusive, and as this feature does not of itself constitute a novel part of my invention, it is thought that no specific description of this nozzle structure is required.

The modified construction shown in Figs. 12, 13 and 14 is similar to that shown in Figs. 1 to 5, inclusive, the only difference being that there are three series of rotary buckets 55, 55ª, 55ᵇ on each side of the disk 56, and two series of stationary buckets 57, 57ª located between the rotary buckets and secured to each portion of the casing instead of one series, as shown in Fig. 1.

It will be understood that in operation the steam is supplied through the steam connections 45 to the chambers 41 and 42, from whence it, due to its intrinsic energy, is projected at high velocity through the nozzles 43 and 44 against the concave surfaces of the inner row of buckets, thus imparting rotary effort to the disk. The form of the buckets is preferably such as to take full advantage of the impact of the steam, and as the steam leaves the discharge edges of the first series of buckets it is directed thereby rearwardly in a direction opposite to that of the motion of the rotary disk. The steam thus discharged from the first series of buckets engages the inner series of stationary buckets, and the concave impact surfaces of these buckets serves to reverse the direction of motion of the steam so that it is projected by the discharge edges of the stationary buckets in the direction of rotation of the rotary disk so as to engage the impact surfaces of the rotary buckets immediately outside of the stationary buckets to thus impart further rotary effort to the rotary disk. This operation of imparting rotary effort to the disk and then reversing the direction of motion of the steam and again imparting rotary effort to the disk by means of a second series of rotary buckets is repeated until the steam leaves the discharge edge of the outer series of rotary buckets at comparatively small velocity, from which it is discharged into the annular chamber formed within the casing around the rotary disk which is connected with the exhaust opening 32. Any desired number of series of rotary buckets may be employed according to the requirements for any particular condition. The sharp edges of the buckets and the relation of the nozzles to them, as well as the relation of the several series of buckets to each other result in the steam being projected at all times against effective rotating surfaces of the buckets, which would not be the case if the buckets had blunt or square edges.

As shown in Fig. 14, the lever 51ª controlling the regulating throttle valve is connected with one end of a bent link 58, the other end of which articulates with the longer end of a bell crank lever 59 pivotally mounted at 60 upon a bracket 61 carried by the casing of the machine. The shorter end of the bell crank lever 59 engages a groove in a sliding collar 62, which collar is normally held in the position shown in the drawings by means of an internal spring, shown more clearly in Fig. 1. A yoke 63 is rigidly secured to the end of the shaft 33ª, as indicated, and has pivotally mounted thereon, at 64, 64, two arms 65, 65 held in the position indicated by the action of the spring referred to. These arms have connections engaging the outer end of the sleeve 62 so that when the speed of the shaft 33ª exceeds a predetermined maximum value, as a result of the centrifugal action of the arms 65, 65, the sleeve 62 is pushed inward against the operation of the spring which moves the bell crank lever 59 and the link 58 in a direction to sufficiently close the throttle valve to slightly reduce the speed of the turbine. Conversely, when, after a condition of normal running speed, the speed for any reason becomes too low, the arms 65 and 65 are moved inward somewhat by the action of the spring coöperating with them, and the throttle is correspondingly opened to supply a larger amount of steam to the turbine and thus accelerate its speed somewhat.

In the construction shown in Fig. 17 the rotary disk is partially indicated in section at 66, and has secured to its outer circumference two series of buckets 67 and 68 having located between them a third series of buckets 69 mounted upon the inner cylindrical surface of the casing 70. The relation of these buckets to each other and to one of the nozzles 71 supplying steam to the turbine is shown more clearly in diagrammatic relation in Fig. 15. A similar construction is shown in Fig. 18 in which the rotary disk 66ª is provided with three series of buckets 72, 73 and 74 between which series intermediate series of buckets 75 and 76 are mounted upon the inner cylindrical surface of the casing 70ª. The relation of these buckets to each other and to one of the operating nozzles 71ª is clearly shown diagrammatically in Fig. 16.

In Fig. 19 the disk 66 is partially shown in side view, and illustrates the mounting of the buckets 67 thereon and the relation of these buckets to the casing 70. Nozzles 71 are also shown for supplying steam to the buckets 67. In Fig. 20 a portion of the casing 70 is shown alone to illustrate the relation thereto of the series of buckets 69.

In connection with the constructions shown in Figs. 15 to 20, inclusive, the operation of the device is substantially the same as that described above, the only difference being that the series of buckets are curved to desired radii on their inner and outer surfaces, whereas in the constructions shown in Figs. 1 to 14, inclusive the series of buckets are bent so that their sides conform to circles of desired radii. Communication of impulses of rotary effort to the rotary disk and the reversal of the direction of steam flow are accomplished in substantially the same manner in either case.

In Figs. 21 and 22 I have shown a modified form of bucket construction in which the strip of metal instead of being formed in the open tooth arrangement shown in Figs. 6 and 7, is formed in a solid or closed tooth arrangement, the teeth 77 consisting of a double thickness of the folded strip, and the bases of the teeth being secured together by the portions 78, which in effect constitute a continuous strip from which the teeth extend. Suitable holes 79 are formed through the base portion 78 at desired intervals, as indicated, to afford a means for conveniently receiving the fastening devices employed to secure the buckets to the rotary disk and to the casing of the turbine to secure a steam turbine construction similar to that shown and described above.

From the above it will be observed that I have provided a novel method of constructing buckets for a steam turbine by means of which the buckets may be formed in strips and then bent to desired radii and assembled upon turbine elements without any resultant sacrifice in accuracy. Furthermore, the bucket construction resulting is rigid, since the buckets are reinforced at both ends, the reinforcing portions at one end constituting the means for engaging the buckets to mount them in place and the reinforcing portions at the other ends serving to secure adjacent pairs of buckets together, and thus prevent deformation of the buckets, since the concave impact surfaces of the buckets result in the formation of rigid stiffening connections at opposite ends of the impact surfaces with the flat reinforcing portions alternating with each other at opposite ends of the buckets to secure the buckets together. As a result of the construction described, when one end of each of a series of buckets is rigidly mounted in place in the turbine, the other ends of the buckets cannot be moved from the proper position by any operation to which the buckets will be subjected in connection with the operation of the turbine.

While I have shown my invention in the particular embodiments herein described, I do not wish to be understood as limiting myself to these exact constructions, as I may employ any equivalent constructions within the scope of the appended claims and my improved buckets may be applied in many different constructions without departing from the spirit of my invention.

What I claim is:

1. A rotary element for a steam turbine, comprising a disk, a series of buckets on each side of said disk, and common fastening devices for securing both series of buckets in place on said disk, each of said series of buckets being formed from strip metal in a tooth arrangement.

2. A rotary element for a steam turbine, comprising a disk, a plurality of series of buckets on each side of said disk, and common fastening devices for securing to said disk corresponding series of buckets located upon opposite sides thereof, each of said series of buckets being formed from strip metal in a tooth arrangement.

3. A rotary element for a steam turbine, comprising a disk, a plurality of series of buckets on each side of said disk, and common fastening devices for securing to said disk corresponding series of buckets located upon opposite sides thereof, each of said series of buckets being formed from sharp-edged strip metal in a tooth arrangement.

4. A rotary element for a steam turbine, comprising a disk, a series of buckets on each side of said disk, and common fastening devices for securing both series of buckets in place on said disk, each series of buckets being formed from strip metal of oval cross-section into a tooth arrangement.

5. A rotary element for a steam turbine, comprising a disk, a plurality of series of buckets on each side of said disk, and common fastening devices for securing to said disk corresponding series of buckets located upon opposite sides thereof, each series of buckets being formed from strip metal of oval cross-section into a tooth arrangement.

6. A rotary element for a steam turbine, comprising a disk, and a series of buckets carried by said disk, said series of buckets being formed from strip metal in a tooth arrangement and said buckets extending the complete depth of said tooth arrangement.

7. A rotary element for a steam turbine, comprising a disk, and a series of buckets carried by said disk, said series of buckets being formed from sharp-edged strip metal in a tooth arrangement and said buckets extending the complete depth of said tooth arrangement.

8. A rotary element for a steam turbine, comprising a disk, and a series of buckets carried by said disk, said series of buckets being formed from strip metal of oval cross-section into a tooth arrangement and said buckets extending the complete depth of said tooth arrangement.

9. A rotary element for a steam turbine, comprising a disk, and a series of buckets carried by said disk, said series of buckets being formed from strip metal connecting and reinforcing the buckets at both ends and said buckets extending the complete distance between the reinforcing portions.

10. A series of buckets for a steam turbine formed from strip metal in a tooth arrangement and said buckets extending the complete depth of said tooth arrangement.

11. A series of buckets for a steam turbine formed from sharp-edged strip metal in a tooth arrangement and said buckets extending the complete depth of said tooth arrangement.

12. A series of buckets for a steam turbine formed from strip metal of oval cross-section into a tooth arrangement and said buckets extending the complete depth of said tooth arrangement.

13. A series of buckets for a steam turbine formed from strip metal connecting and reinforcing the buckets at both ends and said buckets extending the complete distance between the reinforcing portions.

14. A rotary element for a steam turbine, comprising a disk, a series of buckets on each side of said disk, each series being formed from strip metal in an open tooth arrangement, and common fastening devices for securing both series of buckets in place on said disk.

15. A series of buckets for a steam turbine bent from thin strip metal in an open tooth arrangement said buckets extending along the entire faces of the teeth from their bases to the points of said teeth.

16. A series of buckets for a steam turbine formed from strip metal bent into curved bucket portions alternating with flat connecting portions, both portions being of substantially the same width.

17. A series of buckets for a steam turbine formed of strip metal bent into bucket portions alternating with connecting portions, there being curved lines of juncture between said bucket portions and said connecting portions.

18. A series of buckets for a steam turbine formed of strip metal bent into curved bucket portions alternating with flat connecting portions, the bucket portions being bent at an angle to the connecting portions, the bends being at the ends of the curved bucket portions.

In witness whereof, I hereunto subscribe my name this 21st day of September, A. D., 1914.

JOEL EKLUND.

Witnesses:
ALBERT C. BELL,
H. C. JACOBS.

Copies of this patent may be obtained for five cents each, by addressing the "Commissioner of Patents, Washington, D. C."